(12) United States Patent
Rannow (10) Patent No.: US 10,927,866 B2
(45) Date of Patent: Feb. 23, 2021

(54) LEAKAGE MODULATION IN HYDRAULIC SYSTEMS CONTAINING A THREE-WAY SPOOL VALVE

(71) Applicant: Eaton Intelligent Power Limited, Dublin (IE)

(72) Inventor: Michael Rannow, Eden Prairie, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/218,575

(22) Filed: Dec. 13, 2018

(65) Prior Publication Data

US 2019/0186510 A1 Jun. 20, 2019

Related U.S. Application Data (60) Provisional application No. 62/599,393, filed on Dec. 15, 2017.

(51) Int. Cl.
*G05D 7/00* (2006.01)
*F15B 20/00* (2006.01)
(Continued)

(52) U.S. Cl.
CPC ........ *F15B 20/005* (2013.01); *F15B 13/0402* (2013.01); *F15B 13/086* (2013.01); *F16K 11/07* (2013.01); *F16K 31/0675* (2013.01); *G01M 3/2876* (2013.01); *F15B 13/043* (2013.01); *F15B 13/0446* (2013.01); *F15B 2013/0412* (2013.01); *F15B 2211/3111* (2013.01); *F15B 2211/327* (2013.01); *F15B 2211/42* (2013.01); *F15B 2211/6306* (2013.01);
(Continued)

(58) Field of Classification Search
CPC ....... Y10T 137/2544; Y10T 137/86622; Y10T 137/8671
See application file for complete search history.

(56) References Cited

U.S. PATENT DOCUMENTS 4,061,155 A * 12/1977 Sopha ................. F15B 13/0436
137/85
4,456,434 A * 6/1984 El Ibiary ................. F04B 1/324
137/625.65
(Continued)

FOREIGN PATENT DOCUMENTS

DE 4235929 A1 4/1994
JP 6067953 B1 1/2017
(Continued)

OTHER PUBLICATIONS

Extended European Search Report for Application No. 18212817.3 dated May 3, 2019.

*Primary Examiner* — Robert K Arundale
(74) *Attorney, Agent, or Firm* — Merchant & Gould P.C.

(57) ABSTRACT

Hydraulic systems and associated methods configured to reduce leakage past a spool valve when the system is in a neutral state. Leakage reduction is achieved by shifting the spool valve within the spool bore. The shifting direction can depend on whether the system has a relatively high load or a relatively low load in the neutral state. The amount of shifting can depend on the pressure differential between the supply line and the work port, and/or the pressure differential between the work port and the tank line.

17 Claims, 3 Drawing Sheets

(51) Int. Cl.
   *F15B 13/04*     (2006.01)
   *F16K 11/07*     (2006.01)
   *F15B 13/08*     (2006.01)
   *F16K 31/06*     (2006.01)
   *G01M 3/28*      (2006.01)
   *F15B 13/043*    (2006.01)
   *F15B 13/044*    (2006.01)

(52) U.S. Cl.
   CPC .............. *F15B 2211/6309* (2013.01); *F15B 2211/6313* (2013.01); *F15B 2211/857* (2013.01); *F15B 2211/8636* (2013.01); *Y10T 137/2544* (2015.04); *Y10T 137/8671* (2015.04)

(56) References Cited

U.S. PATENT DOCUMENTS

| | | | |
|---|---|---|---|
| 5,165,448 A | | 11/1992 | Handte |
| 5,806,565 A | * | 9/1998 | Kadlicko ............ F15B 13/0402 |
| | | | 137/625.63 |
| 2015/0129072 A1 | * | 5/2015 | Hara ................. F16H 61/0251 |
| | | | 137/625.65 |
| 2019/0003497 A1 | | 1/2019 | Hori et al. |
| 2019/0186510 A1 | * | 6/2019 | Rannow ............... F15B 20/005 |

FOREIGN PATENT DOCUMENTS

| | | |
|---|---|---|
| WO | 2014152379 A2 | 9/2014 |
| WO | 2017/130404 A1 | 8/2017 |

\* cited by examiner

LEAKAGE MODULATION IN HYDRAULIC SYSTEMS CONTAINING A THREE-WAY SPOOL VALVE

CROSS-REFERENCE TO RELATED APPLICATION

This application claims priority to U.S. Provisional Patent Application 62/599,393 filed Dec. 15, 2017, the disclosure of which is incorporated herein by reference in its entirety.

BACKGROUND

In typical hydraulic systems containing a three-way spool valve, undesirable fluid leakage can occur from the fluid supply/pump into the work port, and also from the work port into the tank. Hydraulic systems designed to operate with relatively low service pressure can be more prone to leakage into the work port from supply when sitting idle with a relatively high supply pressure; and hydraulic systems designed to operate with relatively high service pressure can be more prone to leakage out of the work port into the tank when sitting idle.

Such leakage can cause an actuator (e.g., a hydraulic cylinder that drives a load) of the system to undesirably drift over time, negatively impacting system performance. Introducing additional valves can reduce spool valve leakage but at significant increased cost to the system.

SUMMARY

In general terms, the present disclosure is directed to three-way spool valves, hydraulic systems containing three-way spool valves, and associated methods that reduce leakage past three-way spool valves when the system sits idle, i.e., is in neutral. Depending on the pressures of the supply side and the load side, leakage can occur either out of the work port into the tank (e.g., in the case of relatively high/heavy load), or out of the fluid supply/pump into the work port (e.g., in the case of a relatively high supply pressure). The devices, systems and methods of the present disclosure can help to reduce at least one or more of these types of leakage.

One aspect of the present disclosure relates to a hydraulic system, the hydraulic system having an operational state and a neutral state and comprising a fluid supply line having a supply port and in fluid communication with a work port, the work port being in fluid communication with a tank line having a tank port and being connected to a tank, the system further comprising a spool valve having a spool at least partially disposed in a spool bore defining an axis, the spool being axially moveable within the bore and being adapted to regulate fluid flow from the supply line/supply port to the work port and from the work port to the tank/tank port, the system further comprising a driver that drives a first axial shifting of the spool when the hydraulic system is in the neutral state and there is a first pressure differential between the supply line/supply port and the work port, or that drives a second axial shifting of the spool when the hydraulic system is in the neutral state and there is a second pressure differential between the work port and the tank/tank port.

In some examples of the foregoing hydraulic systems, the driver comprises a solenoid. In some examples, the driver comprises one or more proportional solenoids adapted to apply force to the spool in proportion to a current supplied to the solenoid. In alternative examples, the driver comprises a voice coil, which controls a pilot spool, which provides the needed flow/pressure to move the main stage spool, the main stage spool being the spool shown and described in this disclosure. The current to the voice coil is proportional to the flow provided to move the main stage spool.

In some examples of the foregoing hydraulic systems, an amount of the first axial shifting or the second axial shifting of the spool is a function of a magnitude of the first and/or the second pressure differentials.

In some examples of the foregoing hydraulic systems, the first pressure differential is defined by a value that exceeds a threshold pressure differential of a first magnitude and/or the second pressure differential is defined by a value that exceeds a threshold pressure differential of a second magnitude.

In at least some examples of the hydraulic systems and three-way spool valves of the present disclosure, the system/valve comprises one or more biasing mechanisms adapted to axially bias the spool towards a neutral position (or neutral axial position) relative to the bore when the system is in the neutral state. The neutral position of the spool can be a centered position to which the spool is biased when the system is in the neutral state or a position offset from center to which the spool is biased when the system is in the neutral state. In at least some examples, the centered position of the spool relative to the spool bore is the position in which the deadband distances of the supply side land and the tank side land are equal.

Whether a given spool is center-biased or offset-biased in its neutral position, the spool blocks direct fluid communication between the supply port and the work port and between the work port and the tank port when the spool is in the neutral position.

As mentioned, in some examples of the foregoing hydraulic systems, the spool comprises first and second lands, the first land being positioned to block the supply line/supply port when the hydraulic system is in the neutral state, and the second land being positioned to block the tank line/tank port when the hydraulic system is in the neutral state, wherein the first axial shifting causes the first land to shift towards the tank line/tank port, and wherein the second axial shifting causes the second land to shift towards the supply line/supply port.

In some examples of the foregoing hydraulic systems, the first land defines a supply line/supply port deadband distance when the spool is in a centered position relative to the bore and the second land defines a tank line/tank port deadband distance when the spool is in a centered position relative to the bore, and wherein a first distance of the first axial shifting is calibrated to be equal to or not to exceed the tank line/tank port deadband distance, and wherein a second distance of the second axial shifting is calibrated to be equal to or not to exceed the supply line/supply port deadband distance.

In some examples of the foregoing hydraulic systems, the axial shifting of the spool shifts the spool from a neutral position (neutral axial position) to a shifted neutral position (or shifted neutral axial position), wherein the shifted neutral position is determined relative to a centered position of the spool in relation to the bore, or is determined relative to a deadband position of the spool in relation to the bore, the deadband position for a given land of the spool being the position in which that land's deadband distance is zero, i.e., the edge of the land abutting the flow passage is aligned with the edge of the corresponding port.

In some examples of the foregoing hydraulic systems, the system comprises one or more controllers that receives pressure signals from one or more of the work port, supply line/supply port, and tank line/tank port, and provides operating signals to the driver, the operating signals commanding the driver to drive the first or the second axial shiftings away from the neutral position of the spool.

Another aspect of the present disclosure relates to a method of modulating leakage in a hydraulic system, the hydraulic system having an operational state and a neutral state and comprising a fluid supply line/supply port in fluid communication with a work port, the work port being in fluid communication with a tank line/tank port connected to a tank, the hydraulic system further comprising a spool valve having a spool at least partially disposed in a spool bore defining an axis, the spool being axially moveable within the bore and being adapted to regulate fluid flow from the supply line to the work port and from the work port to the tank; the method comprising axially shifting, when the hydraulic system is in the neutral state, the spool away from a neutral position of the spool relative to the bore to a shifted neutral position of the spool relative to the spool bore, the axially shifting occurring in response to a first pressure differential between the supply line/supply port and the work port, or in response to a second pressure differential between the work port and the tank/tank port.

In some examples of the foregoing methods, an amount of the axial shifting is a function of a magnitude of the first and/or the second pressure differential.

In some examples of the foregoing methods, the axially shifting is performed by a solenoid. In alternative examples, the axial shifting is performed by a voice coil, which controls a pilot spool, which provides the needed flow/pressure to move the main stage spool, the main stage spool being the spool shown and described in this disclosure. The current to the voice coil is proportional to the flow provided to move the main stage spool.

In some examples of the foregoing methods, the first pressure differential is defined by a value that exceeds a threshold pressure differential of a first magnitude and/or the second pressure differential is defined by a value that exceeds a threshold pressure differential of a second magnitude.

In some examples of the foregoing methods, the hydraulic system comprises one or more biasing mechanisms adapted to axially bias the spool towards a neutral position relative to the bore when the system is in the neutral state, and the axially shifting of the spool is away from the biased neutral position to a shifted neutral position.

In some examples of the foregoing methods, the one or more biasing mechanisms are adapted to position the spool in a neutral position that is offset from the centered position when the system is in the neutral state.

In some examples of the foregoing methods, the spool comprises first and second lands, the first land being positioned to block the supply line/supply port when the hydraulic system is in the neutral state, and the second land being positioned to block the tank line/tank port when the hydraulic system is in the neutral state, wherein the axially shifting either causes the first land to shift towards the tank line/tank port or causes the second land to shift towards the supply line/supply port.

In some examples of the foregoing methods, the first land defines a supply line/supply port deadband distance when the spool is in a centered position relative to the bore and the second land defines a tank line/tank port deadband distance when the spool is in a centered position relative to the bore, and wherein a distance of the axially shifting is calibrated to be equal to or not to exceed the tank line/tank port deadband distance or the supply line/supply port deadband distance.

In some examples of the foregoing methods, the axially shifting of the spool shifts the spool to a shifted neutral position, wherein the shifted neutral position is determined relative to a centered position of the spool in relation to the bore, or is determined relative to a deadband position of the spool in relation to the bore, the deadband position for a given land of the spool being the position in which that land's deadband distance is zero, i.e., the edge of the land abutting the flow passage is aligned with the edge of the corresponding port.

Yet another aspect of the present disclosure relates to a three-way spool valve comprising: a valve body defining a valve bore that extends along an axis, the valve body also including a supply port, a work port and a tank port all in fluid communication with the valve bore; a spool positioned within the bore, the spool including a first land axially separated from a second land by a flow passage, the spool being axially moveable along the axis between first and second positions, wherein in the first position the second land blocks direct fluid communication between the work port and the tank port and the flow passage provides direct fluid communication between the supply port and the work port, and wherein in the second position the first land blocks direct fluid communication between the supply port and the work port and the flow passage provides direct fluid communication between the work port and the tank port; the valve being operable in a neutral state where the spool is maintained in a shifted neutral axial position in which: a) the first land blocks fluid communication between the supply port and the work port; b) the second land blocks fluid communication between the work port and the tank port; and c) the spool has first and second deadband distances having different magnitudes, the first deadband distance being equal to a first axial distance the spool is required to travel to open fluid communication between the supply port and the work port, and the second deadband distance being equal to a second axial distance the spool is required to travel to open fluid communication between the work port and the tank port.

In some examples of the foregoing three-way spool valves, the first and second lands have equal axial lengths.

In some examples of the foregoing three-way spool valves, the spool is spring biased toward a neutral axial position.

In some examples of the foregoing three-way spool valves, the valve further comprises a spool driver for moving the spool axially, wherein the spool driver moves the spool to the shifted neutral axial position.

In some examples of the foregoing three-way spool valves, a controller determines the magnitude of the difference between the first and second deadband distances based on a first magnitude of a first pressure differential between the supply port and the work port and/or a second magnitude of a second pressure differential between the work port and the tank port, and wherein a spool driver moves the spool to the shifted neutral axis position determined by the controller.

In some examples of the foregoing three-way spool valves, at least when a first pressure differential between the supply port and the work port is larger than a second pressure differential between the work port and the tank port, the first deadband distance is larger than the second deadband distance when the spool is in the shifted neutral axial position.

In some examples of the foregoing three-way spool valves, at least when a first pressure differential between the supply port and the work port is smaller than a second pressure differential between the work port and the tank port, the first deadband distance is smaller than the second deadband distance when the spool is in the shifted neutral axial position.

In some examples of the foregoing three-way spool valves, the magnitude of the difference between the first and the second deadband distances varies with a first magnitude of a first pressure differential between the supply port and the work port and/or with a second magnitude of a second pressure differential between the work port and the tank port, and wherein a spool driver moves the spool to the shifted neutral axis position.

As described herein, a land of the spool blocks its corresponding port when the edge of the land adjacent the flow passage coincides with a region of the spool bore between the corresponding port and the work port. Leakage, as that term is used herein, refers to fluid flow from a blocked port axially past the corresponding land of the spool that is blocking that port and into the flow passage.

As described herein, a first port is open, or in direct fluid communication with a second port, when at least a portion of the first port coincides with the flow passage. The size of the opening of an open port depends on the exact position of the edge of the corresponding land of the spool adjacent the flow passage relative to the port. That is, the size of the opening of an open port depends on the length of the axial portion of the flow passage coinciding with the port. It should be appreciated that flow rate through an open port can be regulated based on the size of opening. Thus, by controlling the exact position of the lands relative to their respective ports, the valves of the present disclosure can be used to generate metered flow through the ports.

The three-way spool valves, hydraulic systems and methods of the present disclosure can be applied in many situations and hydraulic apparatuses. Non-limiting examples of apparatuses that can incorporate systems and methods in accordance with the present disclosure include, e.g., asphalt sprayers, backhoe loaders, wheel loaders, tractors, telehandlers, aerial work platforms, etc.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
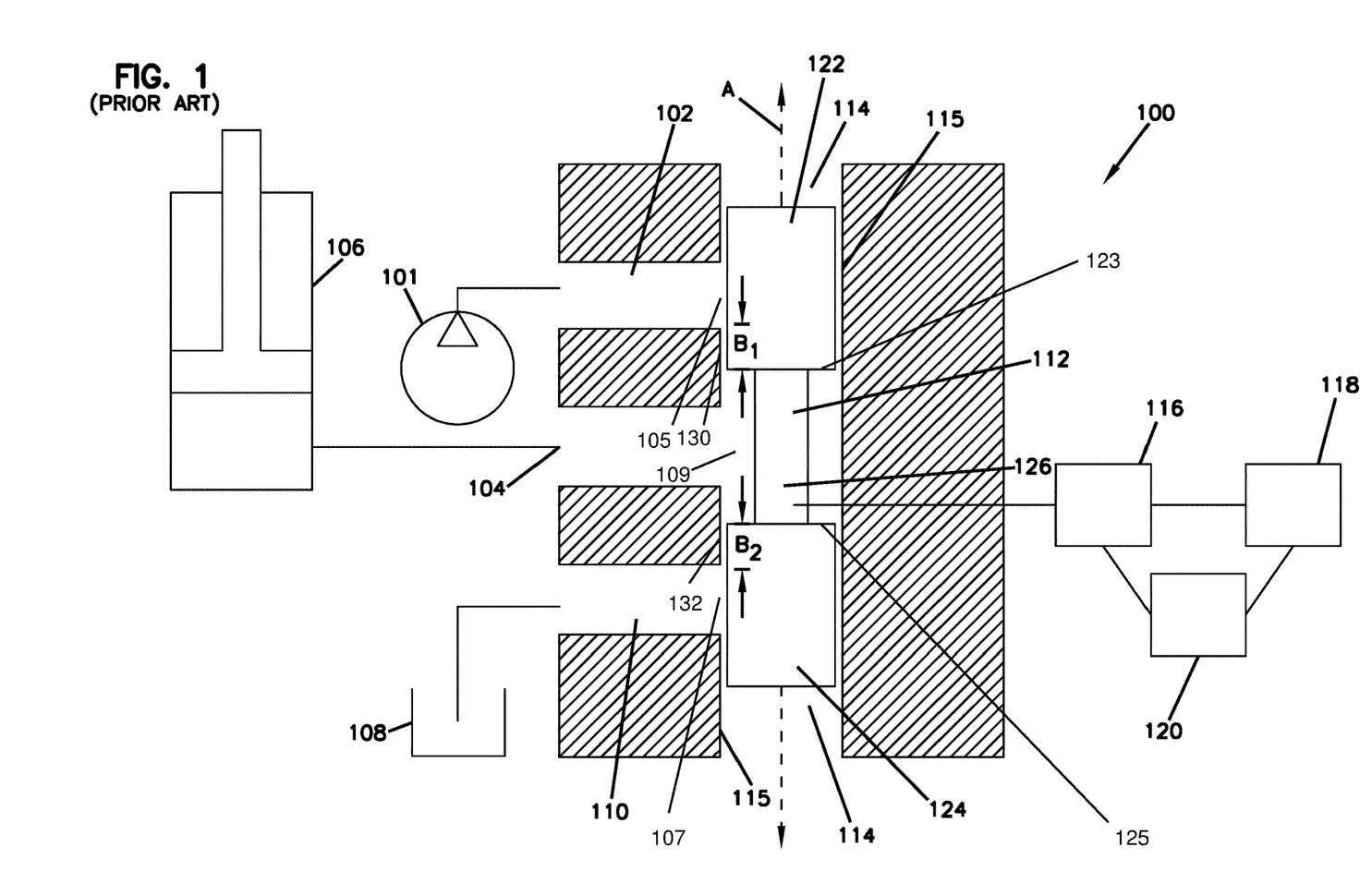
FIG. 1 is a schematic illustration of a prior art hydraulic system including a three-way spool valve, the hydraulic system being in a neutral state.

Referring to FIG. 1, a prior art hydraulic system 100 in a neutral state includes a fluid supply 101 (e.g., a pump) that supplies hydraulic fluid via a supply line 102 through a supply port 105 to a work port 104. The work port 104 is connected to an actuator 106, (e.g., a cylinder), that drives a load. Fluid from the work port empties to the tank 108 via a tank port 107 and tank line 110.

A three-way spool valve includes a spool 112 disposed in a spool bore 114 that defines an axis A.

One or more drivers 116 axially drive(s) the spool 112 to move axially (i.e., in either direction along the axis A) within the spool bore 114. The one or more drivers can be, e.g., one or more solenoids and can be connected to a power source 118 and/or one or more controllers 120 for controlling when the driver(s) 116 are actuated and/or how much to actuate the driver(s) 116.

The spool 112 includes a first or supply side land 122 and a second or tank side land 124. The first and second lands are connected by a shaft 126. The lands and shaft form a rigid structure and move axially within the bore in unison. An axial flow passage 109 is defined between the lands 122 and 124 and, more specifically, between the edge 123 of the supply side land 122 and the edge 125 of the tank side land 124.

The spool 112 regulates fluid flow from the supply line/supply port to the work port, and from the work port to the tank line/tank port. In FIG. 1, the hydraulic system 100 is in a neutral state, the supply side land 122 is blocking the supply port 105, and the tank side land 124 is blocking the tank port 107. That is, the edge 123 of the supply side land 122 coincides (transversely to the axis A) with a region 130 of the spool bore 114 between the supply port 105 and the work port 104; and the edge 125 of the tank side land 124 coincides (transversely to the axis A) with a region 132 of the spool bore 114 between the tank port 107 and the work port 104.

As mentioned, the hydraulic system 100 is in a neutral state. In this neutral state, the spool 112 is in a neutral position (in this example, the neutral position is also a centered position) within the spool bore 114 and with respect to the supply line 102 and the tank line 110. In the neutral and centered position of the spool 112 as shown, the deadband distance B1 of the supply side land 122 is equal to, or at least approximately equal to, the deadband distance B2 of the tank side land 124. Thus, in this example, the supply side and tank side lands are the same or approximately the same size, at least along the axial dimension.

Fluid leakage $Q_{leak,supply}$ in units of volume per time from the supply 101 past the deadband distance B1 of the supply side land 122 into the flow passage 109 when the supply side land 122 is blocking the supply port 105 can be governed by the following equation (1), in which D is the diameter (perpendicular to the axis A) of the supply side land 122, c is the clearance between the supply side land 122 and the wall 115 of the bore 114, $P_s$ is the fluid pressure in the supply line 102, $P_{port}$ is the fluid pressure at the work port (which is partially a function of the load), $x_{supply}$ is the leakage distance (measured along the axis A) past the supply side land 122, which also corresponds to the deadband distance B1, and μ is the viscosity of the hydraulic fluid:

$$Q_{leak,supply} = \frac{D\pi c^3 (P_s - P_{port})}{\mu x_{supply}} \quad (1)$$

Fluid leakage $Q_{leak,tank}$ in units of volume per second from the work port 104 past the deadband distance B2 of the tank side land 124 into the flow passage 109 when the tank side land 124 is blocking the tank port 107 can be governed by the following equation (2), in which D is the diameter (perpendicular to the axis A) of the tank side land 124, c is the clearance between the tank side land 124 and the wall 115 of the bore 114, $P_{tank}$ is the fluid pressure in the tank line 110, $P_{port}$ is the fluid pressure at the work port (which is partially a function of the load), $x_{tank}$ is the leakage distance (measured in along the axis) past the tank side land 124, which also corresponds to the deadband distance B2, and μ is the viscosity of the hydraulic fluid:

$$Q_{leak,tank} = \frac{D\pi c^3 (P_{port} - P_{tank})}{\mu x_{tank}} \qquad (2)$$

In both equations (1) and (2), leakage is inversely proportional to leakage distance.

In the hydraulic system 100, which is in a neutral state, the spool 112 is automatically positioned/returned to the neutral and centered position shown and described above, regardless of any differential ΔP1 between $P_s$ and $P_{port}$ and regardless of any differential ΔP2 between $P_{port}$ and $P_{tank}$. Thus, due to the leakage distances provided by the depicted configuration, the hydraulic system 100 can suffer from unwanted leakage, for example, from the supply 101 to the work port 104 in the event of a positive ΔP1 that induces flow from the supply 101 to the work port 104, as well as leakage from the work port 104 to the tank line 110 in the event of a positive ΔP2 that induces flow from the work port 104 to the tank line 110.

Figure 2:
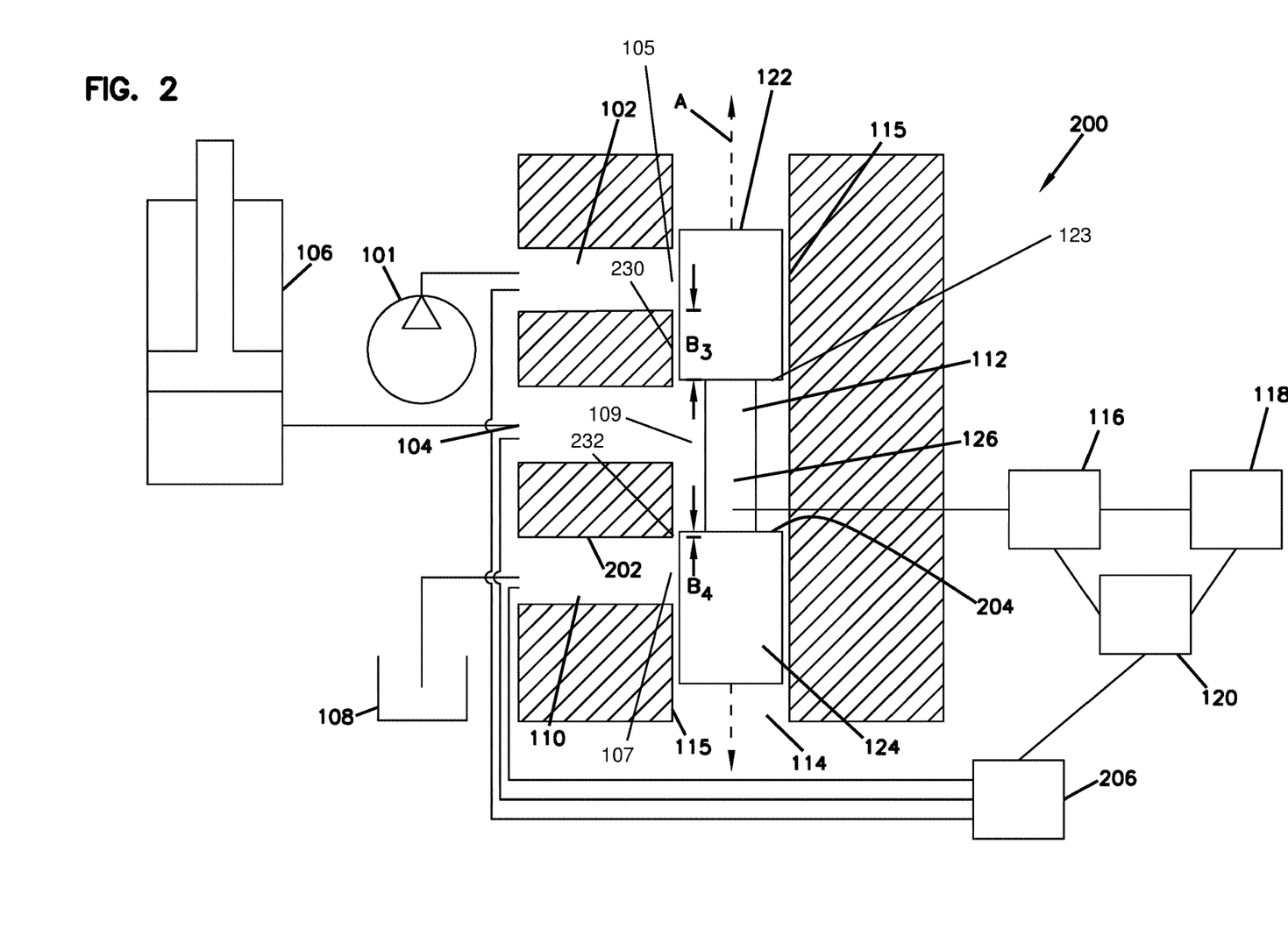
FIG. 2 is a schematic illustration of a hydraulic system including a three-way spool valve in accordance with the present disclosure, the hydraulic system being in a neutral state and the spool valve being in a first position.

Referring now to FIG. 2, a hydraulic system 200 in accordance with the present disclosure and configured to reduce unwanted leakage past the spool valve is schematically illustrated in a neutral state. Many of the features of the system 200 are equivalent to features of the system 100, and are indicated with like reference numbers.

In at least some examples, the hydraulic system 200 can be predisposed to experiencing higher pressure in the supply line 102 than at the work port 104 when the system 200 is in the neutral state, i.e., the system 200 exhibits a positive ΔP1 in the neutral state of the system 200. This can be due to, e.g., a relatively low load when the system is in the neutral state.

The system 200 is designed to reduce $Q_{leak,supply}$ in the neutral state due to the system's predisposition to a positive ΔP1. As shown, the spool 112 is shifted from its neutral position to a shifted neutral position in which the deadband distance B3 of the supply side land 122 is increased compared to the deadband distance B1, and the deadband distance B4 of the tank side land 124 is decreased compared to the deadband distance B2. Relative to the system 100, the supply side land 122 is shifted towards the tank line 110/tank port 107. The distance B3 thus corresponds to a region 230 of the bore 114 that coincides with the supply side land 122, and the distance B4 corresponds to a region 232 of the bore 114 that coincides with the tank side land 124. The region 230 is axially longer than that region would be when the spool 112 is centered, and the region 232 is axially shorter than that region would be when the spool 112 is centered.

Thus, the leakage distance $x_{supply}$ in the system 200 is larger than the leakage distance $x_{supply}$ in the system 100, which can reduce $Q_{leak,supply}$ occasioned by the positive ΔP1.

The amount of shifting of the spool 112 from the spool's neutral position can be calibrated according to any suitable algorithm or function.

In some examples, the amount of shifting is calibrated to or from the edge 202 of the tank line 110/tank port 107, i.e., the deadband position of the corresponding edge of the corresponding land of the spool. For example, the spool 112 is shifted to an axially shifted neutral position that is determined relative to the edge 202 of the tank port 107. In some examples, the shifting is such that the edge 204 (corresponding to the edge 125 in FIG. 1) of the tank side land 124 is aligned with or approximately aligned with the edge 202 of the tank line 110/tank port 107, i.e., the deadband distance B4 is reduced to zero or nearly zero while the tank line 110/tank port 107 still remains blocked by the tank side land 124.

In some examples, the amount of shifting varies according to the magnitude of ΔP1 up to a maximum shifting or shifting limit in which B4 is zero or nearly zero or, alternatively, up to another predefined shifting limit, including even situations in which the tank port 107 is at least partially opened. For example, the spool 112 can be shifted enough to open or partially open the tank line 110/tank port 107 to the work port 104/flow passage 109 (i.e., such that B4 becomes negative).

In some examples, the shifting is triggered only after a threshold ΔP1 is reached. Once the threshold is reached, the amount of shifting can then vary according to the magnitude of ΔP1 or simply as a binary function, e.g., once the threshold is reached the spool is shifted to its singular shifted neutral position, e.g., where B4 is zero or nearly zero or some other position.

In some examples, one or more controllers 120 control one or more drivers 116 that shift the spool 112. In some examples, the controller receives pressure information from one or more pressure sensors 206. The one or more pressure sensors 206 can sense fluid pressure at one or more of, e.g., the supply line 102/supply port 105, the work port 104, and the tank line 110/tank port 107. The pressure information is passed to the one or more controllers 120, which determine(s) whether a shifting of the spool 112 is warranted. If a shifting is warranted the one or more controllers 120 commands the one or more drivers 116 to shift the spool 112 within the bore 114.

In some examples, the one or more drivers 116 include a voice coil, and the voice coil controls a pilot spool, which provides the needed flow/pressure to move the main stage spool 112, the current to the voice coil being proportional to the flow provided to move the main stage spool 112.

In some examples, the system 200 is preset with a preload force on the spool 112 such that the one or more biasing mechanisms that urge the spool 112 is/are configured to urge the spool to a neutral position (e.g., the position of the spool shown in FIG. 2) that is offset from the centered position when the system 200 is in neutral.

Figure 3:
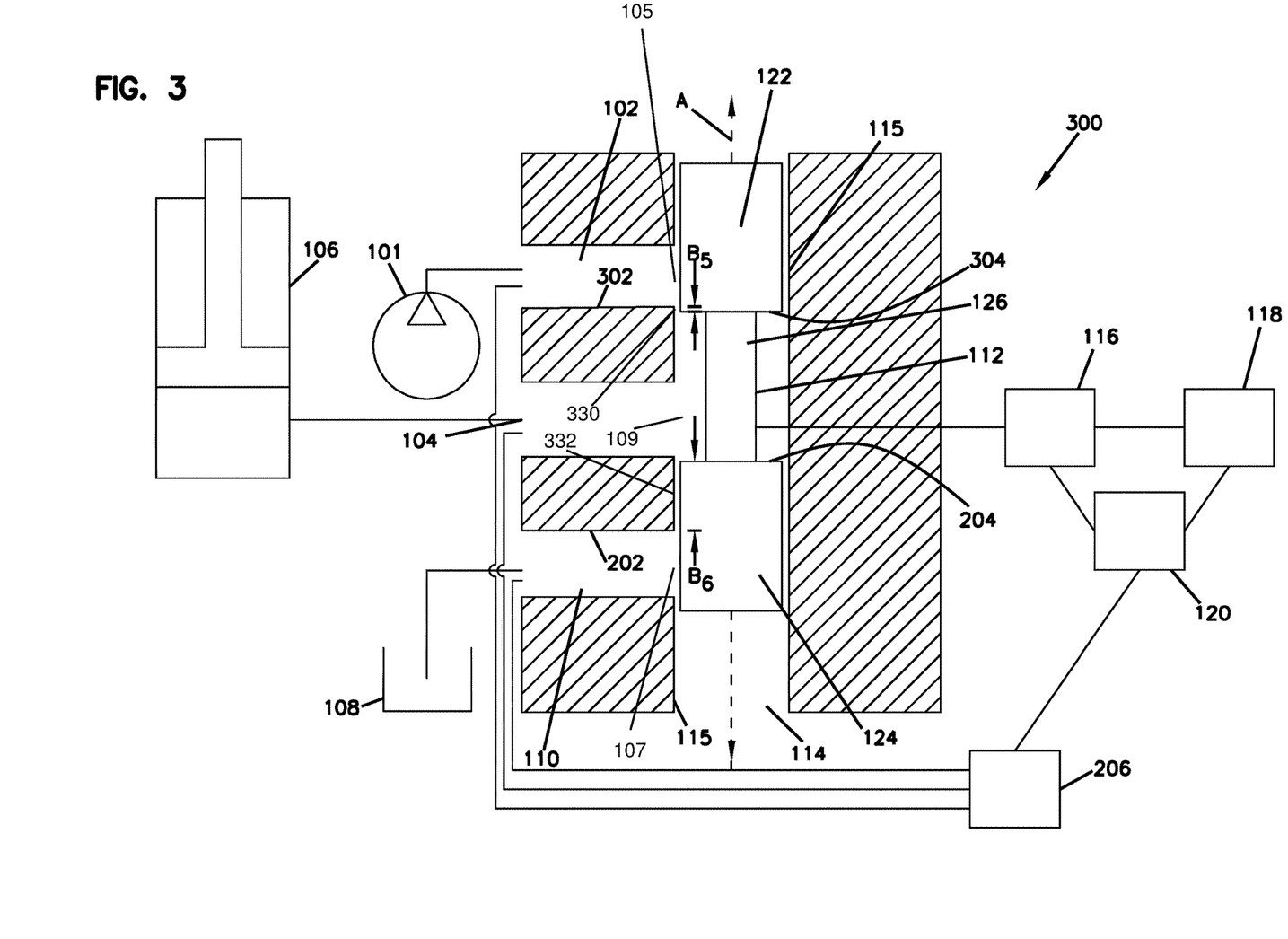
FIG. 3 is a schematic illustration of a hydraulic system including a three-way spool valve in accordance the present disclosure, the hydraulic system being in a neutral state and the spool valve being in a second position.

Referring now to FIG. 3, the hydraulic system 300 is schematically illustrated in a neutral state. Many of the features of the system 300 are equivalent to features of the system 200, and are indicated with like reference numbers.

In at least some examples, the hydraulic system 300 can be predisposed to experiencing higher pressure in the work port 104 than at the tank line 110 when the system 300 is in the neutral state, i.e., the system 300 exhibits a positive ΔP2 in the neutral state of the system 300. This can be due to, e.g., a high/heavy load.

The system 300 is designed to reduce $Q_{leak,tank}$ in the neutral state due to the system's predisposition to a positive ΔP2. As shown, the spool 112 is shifted from its neutral position to a shifted neutral position in which the deadband distance B6 of the tank side land 124 is increased compared to the deadband distance B2, and the deadband distance B5 of the supply side land 122 is decreased compared to the deadband distance B1. Relative to the system 100, the tank side land 124 is shifted towards the supply line 102/supply port 105. The distance B6 thus corresponds to a region 332 of the bore 114 that coincides with the tank side land 124, and the distance B5 corresponds to a region 330 of the bore 114 that coincides with the supply side land 122. The region 332 is axially longer than that region would be when the spool 112 is centered, and the region 330 is axially shorter than that region would be when the spool 112 is centered.

Thus, the leakage distance $x_{tank}$ in the system 300 is larger than the leakage distance $x_{tank}$ in the system 100, which can reduce $Q_{leak,tank}$ occasioned by the positive ΔP2.

As in the system 200 described above, the amount of shifting of the spool 112 from the neutral position in the system 300 can be calibrated according to any suitable algorithm or function, and the shifted neutral position can be determined relative to a centered position (or other neutral position) of the spool with respect to the bore or relative to a deadband position of the spool relative to the bore.

In some examples, the amount of shifting is calibrated to the edge 302 of the supply line 102. That is, the spool 112 is shifted such that the edge 304 (corresponding to the edge 123 in FIG. 1) of the supply side land 122 is aligned with or approximately aligned with the edge 302 of the supply line 102, i.e., the B5 distance is reduced to zero or nearly zero while the supply line 102/supply port 105 remains blocked by the supply side land 122.

In some examples, the amount of shifting varies according to the quantity of ΔP2 up to a maximum shifting or shifting limit in which B5 is zero or nearly zero or, alternatively, up to another predefined shifting limit, including even situations in which the supply port 105 is at least partially opened. For example, the spool 112 can be shifted enough to open or partially open the supply line 102/supply port 105 to the work port 104 (i.e., such that B5 becomes negative).

In some examples, the shifting is triggered only after a threshold ΔP2 is reached. Once the threshold is reached, the amount of shifting can then vary according to the magnitude of ΔP2 or simply as a binary function, e.g., once the threshold is reached the spool is shifted to its singular shifted neutral position, e.g., where B5 is zero or nearly zero, or some other position.

In some examples, one or more controllers 120 control one or more drivers 116 that shift the spool 112 in the system 300. In some examples, the controller receives pressure information from one or more pressure sensors 206. The one or more pressure sensors 206 can sense fluid pressure at one or more of, e.g., the supply line 102/supply port 105, the work port 104, and the tank line 110/tank port 107. The pressure information is passed to the one or more controllers 120, which determine(s) whether a shifting of the spool 112 is warranted. If a shifting is warranted the one or more controllers 120 command(s) the one or more drivers 116 to shift the spool 112 within the bore 114.

In some examples, the system 300 is preset with a preload on the spool 112 such that the one or more biasing mechanisms that urge the spool 112 is/are configured to urge the spool to a neutral position (e.g., the position of the spool shown in FIG. 3) that is offset from the centered position when the system 300 is in neutral.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A hydraulic system, the hydraulic system having an operational state and a neutral state and comprising:
    a fluid supply line having a supply port and being in fluid communication with a work port, the work port being in fluid communication with a tank line, the tank line having a tank port and being fluidly connected to a tank;
    a spool valve having a spool disposed in a spool bore defining an axis, the spool being axially moveable within the bore and being adapted to regulate fluid flow from the supply port to the work port and from the work port to the tank port;
    the spool comprising first and second lands, the first land being positioned to block direct fluid communication from the supply port to the work port when the hydraulic system is in the neutral state, and the second land being positioned to block direct fluid communication to the tank port from the work port when the hydraulic system is in the neutral state;
    the first land defining a supply line deadband distance when the spool is in a centered position relative to the bore and the second land defining a tank line deadband distance when the spool is in the centered position relative to the bore;
    a driver that drives a first axial shifting of the spool when the hydraulic system is in the neutral state and there is a first pressure differential between the supply port and the work port, or that drives a second axial shifting of the spool when the hydraulic system is in the neutral state and there is a second pressure differential between the work port and the tank port,
    the first axial shifting causing the first land to shift towards the tank port, the first axial shifting defining a first distance calibrated to be equal to or not to exceed the tank line deadband distance;
    the second axial shifting causing the second land to shift towards the supply port, the second axial shifting defining a second distance calibrated to be equal to or not to exceed the supply line deadband distance;
    one or more controllers that receives pressure measurements at one or more of the work port, supply port, and tank port, the one or more controllers being adapted to provide operating signals to the driver, the operating signals commanding the driver to drive the first or the second axial shiftings of the spool; and
    one or more pressure sensors that detect one or more fluid pressures associated with one or more of the supply port, the tank port, and the work port.

2. The hydraulic system of claim 1, wherein the driver comprises a solenoid, or wherein the spool is a main stage spool and the driver comprises a voice coil and a pilot spool.

3. The hydraulic system of claim 1, wherein an amount of the first axial shifting or the second axial shifting of the spool is a function of a magnitude of the first or the second pressure differentials, respectively.

4. The hydraulic system of claim 1, wherein the first pressure differential is defined by a value that exceeds a threshold pressure differential of a first magnitude and/or the second pressure differential is defined by a value that exceeds a threshold pressure differential of a second magnitude.

5. The hydraulic system of claim 1, further comprising:
the spool axially biased towards a neutral position relative to the bore when the system is in the neutral state;
wherein each of the first and second axial shiftings of the spool is away from the neutral position to a shifted neutral axial position; and
wherein the neutral position is either a centered position relative to the bore or an off-centered position relative to the bore.

6. The hydraulic system of claim 1, further comprising:
the spool axially biased relative to a neutral position of the spool in relation to the bore when the system is in the neutral state; and
wherein the neutral position is an off-centered position relative to the bore.

7. A hydraulic system, the hydraulic system having an operational state and a neutral state and comprising:
a fluid supply port in fluid communication with a work port, the work port being in fluid communication with a tank port;
a three-way spool valve, comprising a valve body defining a valve bore, and a spool disposed in the valve bore, the valve bore defining an axis, the spool being axially moveable within the valve bore and being adapted to regulate fluid flow from the supply port to the work port and from the work port to the tank port, the spool including a first land axially separated from a second land by a flow passage, the spool being axially moveable along the axis between first and second positions;
wherein in the first position the second land blocks fluid communication between the work port and the tank port and the flow passage provides direct fluid communication between the supply port and the work port; and
wherein in the second position the first land blocks fluid communication between the supply port and the work port and the flow passage provides direct fluid communication between the work port and the tank port, the valve being operable in a neutral state where the spool is maintained in a shifted neutral axial position in which: a) the first land blocks fluid communication between the supply port and the work port; b) the second land blocks fluid communication between the work port and the tank port; and c) the spool has first and second deadband distances having different magnitudes, the first deadband distance being equal to a first axial distance the spool is required to travel to open fluid communication between the supply port and the work port, and the second deadband distance being equal to a second axial distance the spool is required to travel to open fluid communication between the work port and the tank port.

8. The hydraulic system of claim 7, wherein the first and second lands have equal axial lengths.

9. The hydraulic system of claim 7, wherein the spool is spring biased toward the neutral axial position.

10. The hydraulic system of claim 7, further comprising a spool driver for moving the spool axially, wherein the spool driver moves the spool to the shifted neutral axial position.

11. The hydraulic system of claim 7, wherein a controller determines the magnitude of the difference between the first and second deadband distances based on a first magnitude of a first pressure differential between the supply port and the work port and/or a second magnitude of a second pressure differential between the work port and the tank port, and wherein a spool driver moves the spool to the shifted neutral axial position determined by the controller.

12. The hydraulic system of claim 7, wherein when a first pressure differential between the supply port and the work port is larger than a second pressure differential between the work port and the tank port, the first deadband distance is larger than the second deadband distance when the spool is in the shifted neutral axial position.

13. The hydraulic system of claim 7, wherein when a first pressure differential between the supply port and the work port is smaller than a second pressure differential between the work port and the tank port, the first deadband distance is smaller than the second deadband distance when the spool is in the shifted neutral axial position.

14. The hydraulic system of claim 7, wherein the magnitude of the difference between the first and the second deadband distances varies with a first magnitude of a first pressure differential between the supply port and the work port and/or with a second magnitude of a second pressure differential between the work port and the tank port, and wherein a spool driver moves the spool to the shifted neutral axial position.

15. The hydraulic system as in claim 10, wherein the spool is biased towards a centered position relative to the valve bore, and wherein the spool driver holds the spool in the shifted axial neutral position, the shifted axial neutral position being offset from the centered position.

16. A hydraulic system, the hydraulic system having an operational state and a neutral state and comprising:
a fluid supply line in fluid communication with a work port, the work port being in fluid communication with a tank line connected to a tank;
a spool valve having a spool disposed in a spool bore defining an axis, the spool being axially moveable within the bore and being adapted to regulate fluid flow from the supply line to the work port and from the work port to the tank;
a driver that drives a first axial shifting of the spool when the hydraulic system is in the neutral state and there is a first pressure differential between the supply line and the work port, or that drives a second axial shifting of the spool when the hydraulic system is in the neutral state and there is a second pressure differential between the work port and the tank line;
the spool axially biased relative to a neutral position of the spool in relation to the bore when the system is in the neutral state; and
wherein the neutral position is an off-centered position relative to the bore.

17. A hydraulic system, the hydraulic system having an operational state and a neutral state, and comprising:
a fluid supply line having a supply port and being in fluid communication with a work port, the work port being in fluid communication with a tank line having a tank port and being connected to a tank;
a spool valve having a spool disposed in a spool bore defining an axis, the spool being axially moveable within the bore and being adapted to regulate fluid flow from the supply line to the work port and from the work port to the tank; and
a driver that drives a first axial shifting of the spool from a first position to a second position when the hydraulic system is in the neutral state, the first axial shifting being in response to a detected first pressure differential between the supply port and the work port, or that drives a second axial shifting of the spool from a third position to a fourth position when the hydraulic system is in the neutral state, the second axial shifting being in response to a detected second pressure differential between the work port and the tank port,
wherein at each of the first position, the second position, the third position, and the fourth position, the spool blocks the supply port and the tank port.

* * * * *